US012433336B2

(12) United States Patent
Luo et al.

(10) Patent No.: US 12,433,336 B2
(45) Date of Patent: Oct. 7, 2025

(54) ATOMIZING ASSEMBLY AND ELECTRONIC ATOMIZING DEVICE

(71) Applicant: SHENZHEN SMOORE TECHNOLOGY LIMITED, Shenzhen (CN)

(72) Inventors: Hongliang Luo, Shenzhen (CN); Lingrong Xiao, Shenzhen (CN); Xiaoping Li, Shenzhen (CN); Congwen Xiao, Shenzhen (CN); Xuebo Xue, Shenzhen (CN)

(73) Assignee: SHENZHEN SMOORE TECHNOLOGY LIMITED, Shenzhen (CN)

( * ) Notice: Subject to any disclaimer, the term of this patent is extended or adjusted under 35 U.S.C. 154(b) by 469 days.

(21) Appl. No.: 17/628,826

(22) PCT Filed: Jul. 23, 2020

(86) PCT No.: PCT/CN2020/103663
§ 371 (c)(1),
(2) Date: Jan. 20, 2022

(87) PCT Pub. No.: WO2021/013208
PCT Pub. Date: Jan. 28, 2021

(65) Prior Publication Data

US 2022/0256924 A1 Aug. 18, 2022

(30) Foreign Application Priority Data

Jul. 23, 2019 (CN) ......................... 201910665778.7

(51) Int. Cl.
*A24F 47/00* (2020.01)
*A24F 40/10* (2020.01)
(Continued)

(52) U.S. Cl.
CPC .............. *A24F 40/46* (2020.01); *A24F 40/10* (2020.01); *A24F 40/44* (2020.01); *H05B 3/06* (2013.01); *H05B 2203/021* (2013.01)

(58) Field of Classification Search
CPC .............. A24F 40/46; H05B 2203/013; H05B 2203/003; H05B 2203/021
See application file for complete search history.

(56) References Cited

U.S. PATENT DOCUMENTS

2016/0007652 A1* 1/2016 Taluskie .................. A24F 40/46 131/328
2018/0007741 A1* 1/2018 Metz ........................ H05B 3/48
(Continued)

FOREIGN PATENT DOCUMENTS

CN 107173849 A 9/2017
CN 107529828 A * 1/2018 ............. A24F 40/30
(Continued)

OTHER PUBLICATIONS

CN109222245A, “Atomizer heating element and atomizer” (Year: 2019).*
(Continued)

*Primary Examiner* — Eric Yaary
(74) *Attorney, Agent, or Firm* — Ballard Spahr LLP

(57) ABSTRACT

An atomizing assembly, comprising a base comprising an atomizing surface for atomizing liquid to form smoke; a heating body for connecting to a power supply to heat the surface, and directly or indirectly disposed on the surface, wherein the projection area of the heating body is less than the area of the surface, so that the atomizing surface is divided into a heating area occupied by the projection of the heating body, and a blank area surrounding the heating area; and a heat conductor at least partially disposed in the blank area of the atomizing surface and connected to the heating body. The heat conductor can transfer a large variety of
(Continued)

energies from the heating area into the blank area, so that the temperature of the blank area rises to the same level as the temperature of the heating area, ensuring that the temperatures of all parts on the entire.

13 Claims, 5 Drawing Sheets

(51) Int. Cl.

| | |
|---|---|
| ***A24F 40/44*** | (2020.01) |
| ***A24F 40/46*** | (2020.01) |
| ***H05B 3/06*** | (2006.01) |

(56) References Cited

U.S. PATENT DOCUMENTS

| | | | | |
|---|---|---|---|---|
| 2018/0177240 A1* | 6/2018 | Duque | .................... | A24F 40/44 |
| 2020/0359704 A1* | 11/2020 | Deng | ...................... | A24F 40/70 |

FOREIGN PATENT DOCUMENTS

| | | | |
|---|---|---|---|
| CN | 108430244 A | 8/2018 | |
| CN | 108601406 A | 9/2018 | |
| CN | 109222245 A * | 1/2019 | ........... A24F 47/008 |
| CN | 208446607 U | 2/2019 | |
| CN | 109414078 A | 3/2019 | |
| CN | 109527657 A | 3/2019 | |
| CN | 109619683 A | 4/2019 | |
| CN | 109619697 A | 4/2019 | |
| CN | 109674094 A | 4/2019 | |
| CN | 109875124 A | 6/2019 | |
| CN | 109875125 A | 6/2019 | |
| CN | 208941045 U | 6/2019 | |
| CN | 109984385 A | 7/2019 | |
| CN | 110022622 A | 7/2019 | |
| CN | 110447959 A | 11/2019 | |
| CN | 211407651 U | 9/2020 | |
| KR | 101927135 B1 | 12/2018 | |

OTHER PUBLICATIONS

CN107529828A, "Aerosol Delivery Device With Microfluidic Delivery Component" (Year: 2018).*

International Search Report and Written Opinion from International Application No. PCT/CN2020/103663 mailed Oct. 29, 2020.

First Office Action for Chinese Application No. 201910665778.7 mailed Feb. 21, 2024.

Second Office Action for Chinese Application No. 201910665778.7 mailed May 30, 2024.

* cited by examiner

ATOMIZING ASSEMBLY AND ELECTRONIC ATOMIZING DEVICE

TECHNICAL FIELD

The present disclosure relates to the field of electronic atomization technology, in particular to an atomizing assembly and an electronic atomizing device including the atomizing assembly.

BACKGROUND

The electronic atomizing device has an appearance and a taste similar to that of ordinary cigarettes, but usually does not contain other harmful components such as tar and suspended particles in the cigarette. Therefore, the electronic atomizing device is generally used as a substitute for cigarettes. Generally, an atomizing assembly of the electronic atomizing device generally includes a base body and a heating component attached to an atomizing surface of the base body or concealed in a position close to the atomizing surface in the base body. However, the oil close to the heating component on the atomizing surface can fully atomize the smoke with higher concentration, while the oil away from the heating component on the atomizing surface can atomize the smoke with lower concentration, which leads to uneven smoke concentration and affects the user's inhale taste.

SUMMARY

According to various embodiments of the present disclosure, an atomizing assembly is provided, which includes:

a base body including an atomizing surface configured to atomize liquid into smoke;

a heating element configured to be connected to a power source to heat the atomizing surface, the heating element is directly or indirectly disposed on the atomizing surface, and an area of a projection of the heating element on the atomizing surface is less than an area of the atomizing surface, such that the atomizing surface is divided into a heating region occupied by the projection of the heating element and a blank region surrounding the heating region; and a heat conductor at least partially disposed in the blank region of the atomizing surface and connected to the heating element.

In one of the embodiments, both the heating element and the heat conductor are directly attached to the atomizing surface.

In one of the embodiments, the heat conductor includes a plurality of heat conduction units discretely arranged, one end of the heat conduction unit is connected to the heating element, and the other end of the heat conduction unit is a free end and located in the blank region of the atomizing surface.

In one of the embodiments, the heat conduction unit is linear, polygonal or curved in shape.

In one of the embodiments, the heating element is an integrally formed open-loop structure, the heating element includes a plurality of first heating units and a plurality of second heating units, the plurality of first heating units extend in a first direction and are spaced apart from each other, the plurality of second heating units extend in a second direction and are spaced apart from each other, the second direction forms a setting angle with the first direction, and both ends of the first heating unit are connected to ends of the two adjacent second heating units, respectively.

In one of the embodiments, the second heating unit located at an end of the heating element has the largest width, and the first direction is perpendicular to the second direction.

In one of the embodiments, the heat conductor includes a plurality of heat conduction units discretely arranged, at least part of the heat conduction unit is connected to an intersection between the first heating unit and the second heating unit.

In one of the embodiments, the heat conductor is attached to the heating region and the blank region of the atomizing surface, the heating element is attached to a surface of the heat conductor or is embedded inside the heat conductor; an area of a projection of the heat conductor on the atomizing surface is less than or equal to the area of the atomizing surface.

In one of the embodiments, a distance from the heating element to the atomizing surface is constant everywhere.

In one of the embodiments, the heating element is a metal heating film.

In one of the embodiments, the heat conductor is a porous ceramic film, porous carbon or a porous metal film.

In one of the embodiments, a porosity of the heat conductor is in a range from 30% to 70%.

In one of the embodiments, a thickness of the heat conductor is in a range from 20 μm to 150 μm.

In one of the embodiments, a thermal conductivity of the heat conductor is in a range from 30 w/m·k to 400 w/m·k.

An electronic atomizing device is further provided, which includes any one of the aforementioned atomizing assembly.

In one of the embodiments, the electronic atomizing device is provided with a liquid reservoir configured to store the liquid, and the base body further includes a liquid absorption surface, the liquid absorption surface transfers the liquid absorbed from the liquid reservoir to the atomizing surface through an interior of the base body.

The details of one or more embodiments of the present disclosure are set forth in the following drawings and description. Other features, purposes and advantages of the present disclosure will become apparent from the description, drawings and claims.

In order to better describe and explain the embodiments and/or examples of those inventions disclosed herein, one or more drawings may be referred to. The additional details or examples used to describe the drawings should not be considered as limiting the scope of any of the disclosed inventions, the currently described embodiments and/or examples, and the best mode of these inventions currently understood.

DETAILED DESCRIPTION OF THE EMBODIMENTS

In order to facilitate the understanding of the present disclosure, the present disclosure will be described more completely hereinafter with reference to the related accompanying drawings. Preferable embodiments of the present disclosure are presented in the accompanying drawings. However, the present disclosure may be embodied in many different forms and is not limited to the implementations described herein. Rather, these implementations are provided so that the understanding of the disclosure of the present disclosure will be more thorough and complete.

It should be understood that when an element is defined as "fixed to" another element, it is either directly on an element or indirectly on an element with a mediating element. When an element is considered to be "connected" to another element, it can be directly connected to another element or indirectly connected to another element with a mediating element. The terms "in", "out", "left", "right" and similar expressions used herein are for illustrative purposes only and are not meant to be the only implementation.

Figure 1:
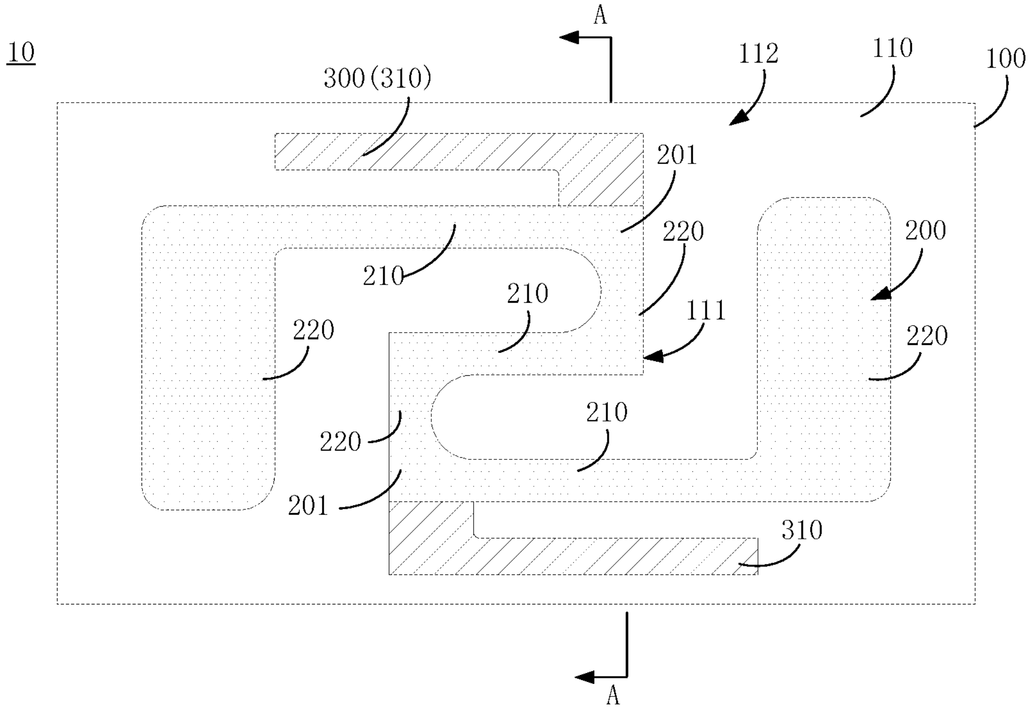
FIG. 1 is a top view of a first example of an atomizing assembly provided by a first embodiment.
Figure 2:
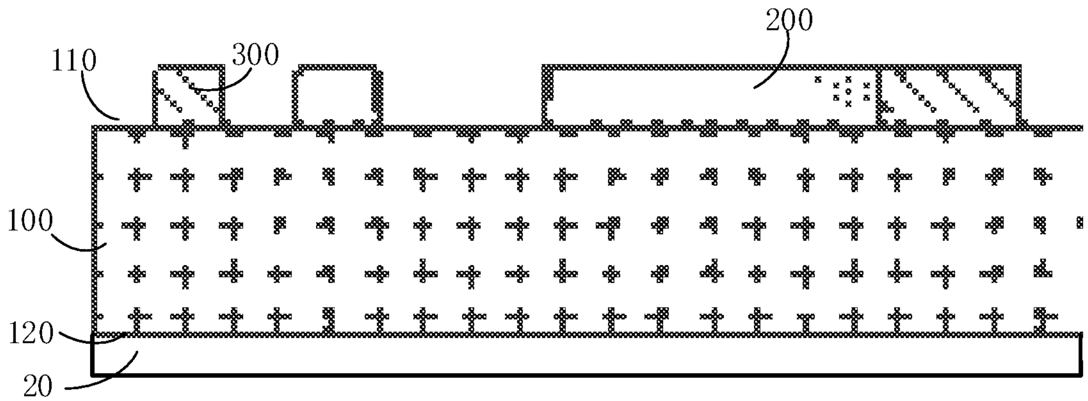
FIG. 2 is a cross-sectional view taken along A-A in FIG. 1.

Referring to FIG. 1, an embodiment of the present disclosure provides an atomizing assembly 10. The atomizing assembly 10 is configured to atomize liquid such as aerosol generating substrate to form smoke for the user to inhale. The assembly 10 includes a base body 100, a heating element 200, and a heat conductor 300.

Specifically, referring to the FIGS. 1 to 4, the base body 100 may be made of a porous ceramic material. The base body 100 includes a large number of micropores and has a certain porosity. Porosity can be defined as a percentage of a volume of pores in an object to a total volume of the material in its natural state. For example, the porosity of the base body 100 may be in a range from 30% to 60%, and the cross-sectional size of the micropores may be in a range from 20 μm to 70 μm. Since the base body 100 has a certain porosity, the base body 100 can generate capillary effect.

In addition, the base body 100 has a liquid absorption surface 120 and an atomizing surface 110. The liquid absorption surface 120 and the atomizing surface 110 can be arranged in parallel. When the liquid absorption surface 120 of the base body 100 is in contact with the liquid, the liquid will be adsorbed on the liquid absorption surface 120. At the same time, the liquid on the liquid absorption surface 120 will be continuously transferred to the atomizing surface 110 through an interior of the base body 100 under the capillary effect, and the heating element 200 is configured to be connected to a power source to generate heat, so as to atomize the liquid on the atomizing surface 110 to form smoke. When the porosity increases, a liquid transferring speed of the base body 100 for the liquid can be increased, such that the liquid on the liquid absorption surface 120 can be transferred to the atomizing surface 110 in a shorter time; when the porosity decreases, a liquid-locking ability of the base body 100 can be increased to prevent the liquid in the base body 100 from leaking from the surface of the base body 100. Therefore, in order to balance the liquid transferring speed and the liquid-locking ability of the base body 100, a suitable specific value should be selected within the aforementioned porosity value range. An extension direction of the micropores can be perpendicular to the liquid absorption surface 120 and the atomizing surface 110, such that the liquid can reach the atomizing surface 110 from the liquid absorption surface 120 in a shortest distance, thereby increasing the liquid transferring speed of the base body 100 to the liquid.

Specifically, the heating element 200 may be a metal heating film. An area of a projection of the heating element 200 on the atomizing surface 110 is less than an area of the atomizing surface 110, that is, the projection of the heating element 200 on the atomizing surface 110 does not cover the entire atomizing surface 110. This arrangement can, on the one hand, ensure that smoke overflows from other parts of the atomizing surface 110 that are not blocked by the heating element 200. On the other hand, the heating element 200 can be used as a reference to divide the atomizing surface 110 into a heating region 111 and a blank region 112. That is, a region of the atomizing surface 110 occupied by a projection of the heating element 200 is the heating region 111, and a region surrounding the heating region 111 is the blank region 112. Therefore, when the heating element 200 starts to work, a temperature of the heating area 111 is apparently higher than a temperature of the blank region 112.

Specifically, the heat conductor 300 is connected to the heating element 200 and is at least partially disposed in the blank region 112 of the atomizing surface 110, such that the heat conductor 300 can conduct the heat of the heating region 111 to the blank region 112. The heat conductor 300 can be a film-like structure such as a porous ceramic film, porous carbon or a porous metal film. A thickness of the heat conductor 300 is in a range from 20 μm to 150 μm. For example, the thickness of the heat conductor 300 can be 20 μm, 40 μm, 50 μm, or 150 μm. A thermal conductivity of the heat conductor 300 is in a range from 30 w/m·k to 400 w/m·k. According to actual needs, the thermal conductivity can be set to a value of 30 w/m·k, 50 w/m·k, 100 w/m·k, or 400 w/m·k. The heat conductor 300 also has a porous structure and has a certain porosity. The porosity of the heat conductor 300 is in a range from 30% to 70%. For example, the porosity can be 30%, 40%, or 70%.

For the conventional atomizing assembly 10, the thermal conductivity of the base body 100 is poor, therefore, the heating region 111 has more heat distribution, such that relatively more liquid is atomized in the same time, and a concentration of the smoke formed by the atomization is relatively higher; at the same time, there is enough heat to destroy the force between the liquid molecules, such that a particle size of the smoke formed by atomization is smaller. On the contrary, since the heat distribution in the blank region 112 is relatively small, the concentration of the smoke formed after atomization is relatively low and the particle size is relatively large. Therefore, due to an inconsistency of the smoke concentration and the particle size on all parts of the atomizing surface 110, the user's inhale taste will eventually be affected.

However, in this embodiment, the heat conductor 300 has a relatively high thermal conductivity and a good thermal-conducting performance. Since the heat conductor 300 can transfer more heat from the heating region 111 to the blank region 112 to remedy the lack of heat in the blank region 112, the temperature of the blank region 112 is increased to be equal to a temperature of the heating region 111, thus ensuring all parts of the entire atomizing surface 110 have the same temperature to achieve thermal balance, that is, the heat distribution on the atomizing surface 110 is uniform, such that the concentration of the smoke generated by the atomization of the liquid on all parts of the atomizing surface 110 is constant, and at the same time, it also enables the particles of the smoke formed after the liquid is atomized on equal in size all parts of the atomizing surface 110, which ultimately guarantees the user's inhale taste. Furthermore, since the heat conductor 300 has porosity, the heat conductor 300 and the base body 100 will also have the capillary effect. Through the common capillary effect of the two, the liquid on the liquid absorption surface 120 can be transferred to the atomizing surface 110 at a faster speed, which improves the liquid conductivity of the entire atomizing assembly 10, ensures that there is always sufficient liquid on the atomizing surface 110 for atomization, and avoids dry burning caused by insufficient liquid on the atomizing surface 110.

Figure 3:
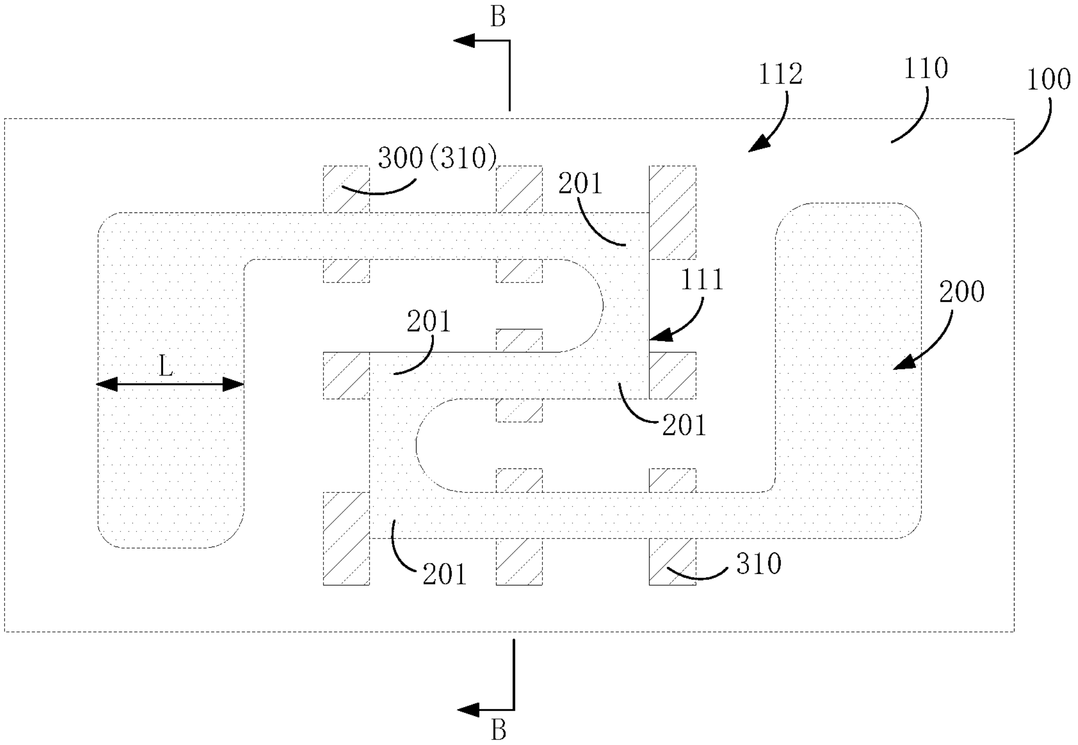
FIG. 3 is a top view of a second example of an atomizing assembly provided by the first embodiment.
Figure 4:
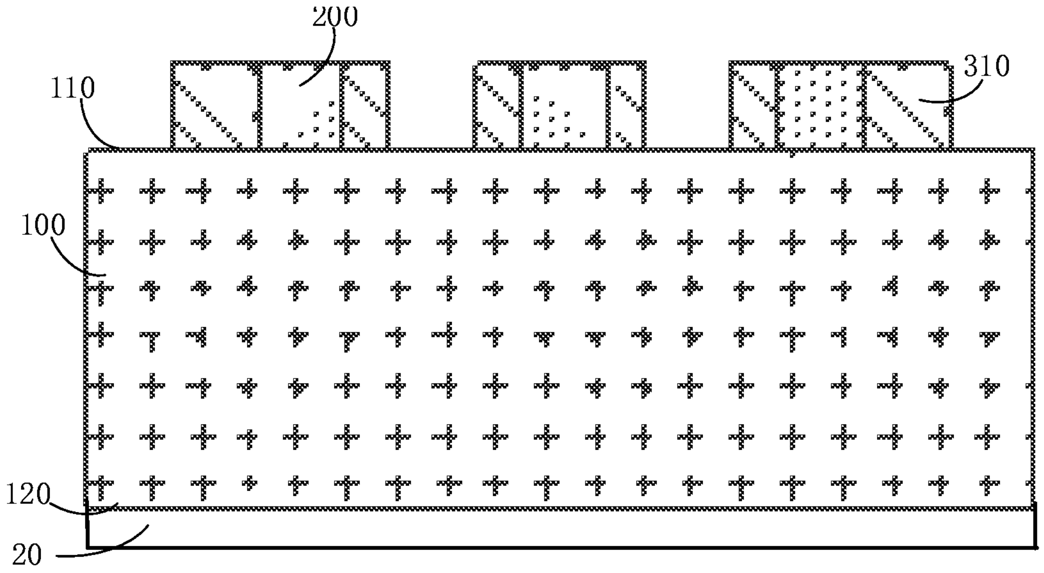
FIG. 4 is a cross-sectional view taken along B-B in FIG. 3.
Figure 5:
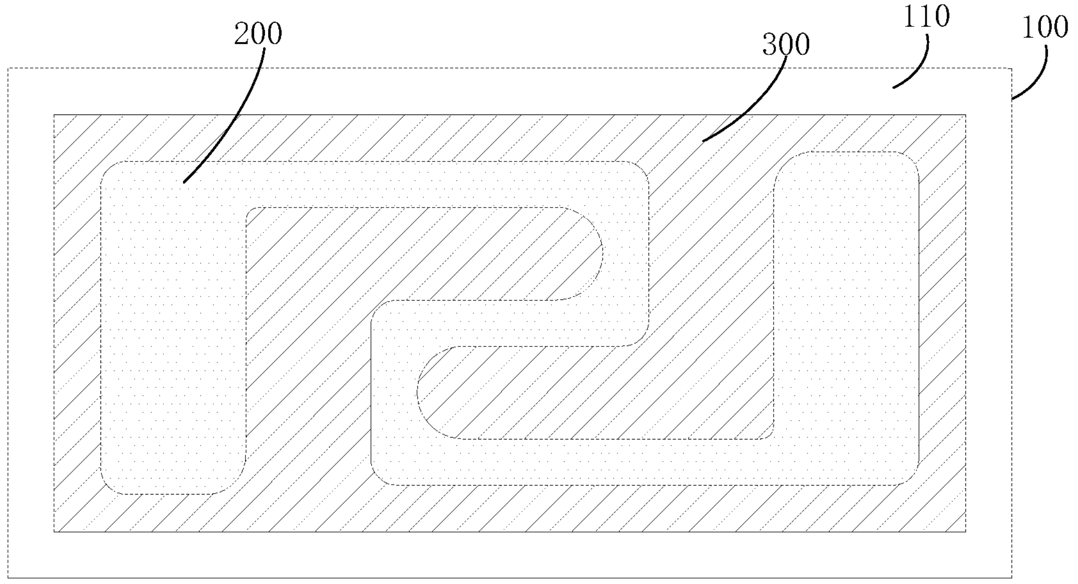
FIG. 5 is a top view of the first example of an atomizing assembly provided by the second embodiment.

Referring to FIGS. 1 and 3, in some embodiments, the heating element 200 is an integrally formed an open-loop structure. The heating element 200 includes a plurality of first heating units 210 and a plurality of second heating units 220. Both the first heating units 210 and the second heating units 220 are in a straight strip shape, and the plurality of first heating units 210 extend along the first direction and are spaced apart from each other. For example, three first heating units 210 extend along a transverse direction. The plurality of second heating units 220 extend along the second direction and spaced apart from each other. For example, four second heating units 220 extend along a longitudinal direction, that is, the first direction and the second direction are perpendicularly arranged with an angle of 90 degrees. At this time, the first heating unit 210 and the second heating unit 220 are sequentially connected end to end to form the heating element 200 in a shape of a broken line, which can simplify the manufacturing process of the heating element 200 and reduce its manufacturing cost. In this embodiment, two of the four second heating units 220 are located on both sides and aligned at both ends, and a length and a width of the other two second heating units 220 are both less than the two second heating units 220 and arranged between the two second heating units 220; the other two second heating units 220 are connected via a first heating unit 210, and each of the other two second heating units 220 has an end aligned with the two second heating units 220.

Further, both ends of the heating element 200 are formed by the second heating unit 220, and both ends of the first heating unit 210 are connected to the ends of two adjacent second heating units 220, respectively, such that the first heating unit 210 is located between two adjacent second heating units 220. Since the first heating unit 210 and the second heating unit 220 in a middle of the heating element 200 are densely distributed, and the first heating unit 210 and the second heating unit 220 at the end of the heating element 200 are relatively sparsely distributed, the middle of the heating element 200 generates more heat and the temperature is high. In order to ensure that the temperature at the end of the heating element 200 is consistent with the temperature in the middle, the width L of the second heating unit 220 at the end of the heating element 200 can be maximized (referring to FIG. 3), such that the second heating unit 220 with a greater width L can also generate more heat to compensate for the insufficient heat at the end of the heating element 200 due to the sparse distribution of the heating units, and finally make the temperature on all parts of the entire heating element 200 approximately equal.

In other embodiments, the heating element 200 may have the open-loop structure such as a spiral, a Z-shape, or a plurality of parallel strips. Of course, the heating element 200 may also have a closed-loop structure such as a circular ring, or a combination of the open-loop structure and the closed-loop structure. The heating element 200 may also be a non-integral connection structure composed of a plurality of heating units arranged discretely.

Referring to FIGS. 1 to 4 at the same time, in some embodiments, a bottom surface of the heating element 200 can be directly attached to the atomizing surface 110 of the base body 100 by printing, and the bottom surface of the heat conductor 300 can also be directly attached to the atomizing surface 110 of the base body 100 by printing. A thickness of the heating element 200 and the thickness of the heat conductor 300 may be exactly equal, such that an upper surface of the heating element 200 and an upper surface of the heat conductor 300 are coplanar with each other. The heat conductor 300 at this time includes a plurality of heat conduction units 310 discretely arranged, and the plurality of heat conduction units 310 may be arranged in a matrix on the atomizing surface 110 (referring to FIG. 3 and FIG. 4). One end (a fixed end) of the heat conduction unit 310 is connected to the heating element 200, and the other end of the heat conduction unit 310 is a free end. The free end is located in the blank region 112 of the atomizing surface 110. When the heating element 200 works, the heat of the heating region 111 can be conducted to the blank region 112 through the conduction of the heat conductor 300 until the two regions have the same temperature and uniform heat distribution, which ensures that the smoke concentration and the particle size are uniform in all parts of the atomizing surface 110, thereby improving the user's inhale taste. At the same time, by directly attaching the heat conductor 300 and the heating element 200 to the atomizing surface 110, a size of the entire atomizing assembly 10 in the thickness direction can be reduced, making the overall structure of the atomizing assembly 10 more compact. At the same time, the heating element 200 is directly connected to the atomizing surface 110, and heat can be quickly transferred to the atomizing surface 110 in a short time, which improves a heat transferring efficiency of the atomizing assembly 10 and a reaction sensitivity to heating.

Figure 9:
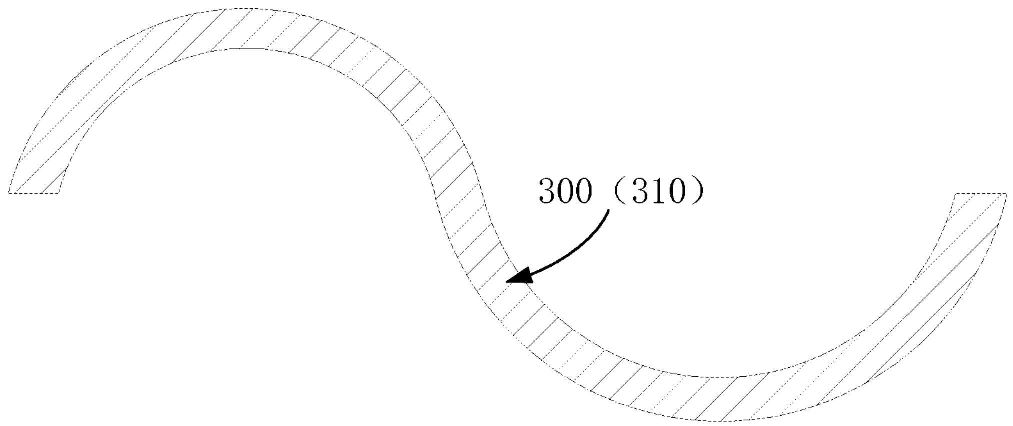
FIG. 9 is a schematic view of a heat conductor of the atomizing assembly provided by an embodiment.

Optionally, each heat conduction unit 310 may be linear (referring to FIG. 3), may also be in a shape of a broken line (referring to FIG. 1), or may be in a shape of an arc such as a sine curve or a circular arc (referring to FIG. 9). In the embodiment in which the heating element 200 is an integrally formed open-loop structure, since an intersection 201 between the first heating unit 210 and the second heating unit 220 generates more heat, more heat is concentrated at this position of the atomizing surface 110 and the temperature is higher. By connecting at least part of the heat conduction unit 310 to the intersection 201 between the first heating unit 210 and the second heating unit 220, the heat in the heating region 111 is quickly transferred to the blank region 112. Of course, the fixed ends of other parts of the heat conductor 300 can be separately connected to the first heating unit 210 or the second heating unit 220.

Referring to FIGS. 5 to 8 at the same time, in some embodiments, the heat conductor 300 is directly attached to the atomizing surface 110, and the heating element 200 is directly attached to the heat conductor 300, that is, the heating element 200 doesn't form a direct attachment connection with the atomizing surface 110. For example, referring to FIG. 6, the heat conductor 300 is directly attached to the atomizing surface 110, and the heating element 200 is attached to a surface of the heat conductor 300 away from the atomizing surface 110, that is, the heating element 200, the heat conductor 300 and the base body 100 form a laminating relationship from top to bottom. At this time, the heat conductor 300 may be an integrally formed layered structure, an area of a projection region of the heat conductor

300 on the atomizing surface 110 is less than or equal to the area of the atomizing surface 110, and the heating element 200 is located within a coverage of the heat conductor 300, such that the heat conductor 300 has a good support effect for the heating element 200, ensuring a stable and reliable mounting of the heating element 200, and also facilitates the heat generated by the heating element 200 to be transferred downward through the heat conductor 300 and uniformly distributed on the atomizing surface 110. For another example, referring to FIG. 7, the heat conductor 300 is also directly attached to the atomizing surface 110, and the heat element 200 is completely embedded inside the heat conductor 300. Since the heat conductor 300 wraps the heat element 200, the heat conductor 300 can form a good protective effect for the heating element 200, thus preventing the heating element 200 from being in contact with oxygen to perform an oxidation reaction. For another example, referring to FIG. 8, the number of heat conductors 300 is two, one of the heat conductors 300 is directly attached to the atomizing surface 110, the heating element 200 is directly attached to the heat conductor 300, and the other one of the heat conductors 300 is then attached to a surface of the heating element 200. Apparently, the heating element 200 is sandwiched between the two heat conductors 300. At this time, the heating element 200 and the two heat conductors 300 form a stacking relationship with each other and have the same area, such that a side surface of the heating element 200 and a side surface of the heat conductor 300 are exactly coplanar, and the heat conductor 300 cannot form a wrapping effect for the heating element 200. Similarly, the uppermost heat conductor 300 can also protect the heating element 200.

Figure 6:
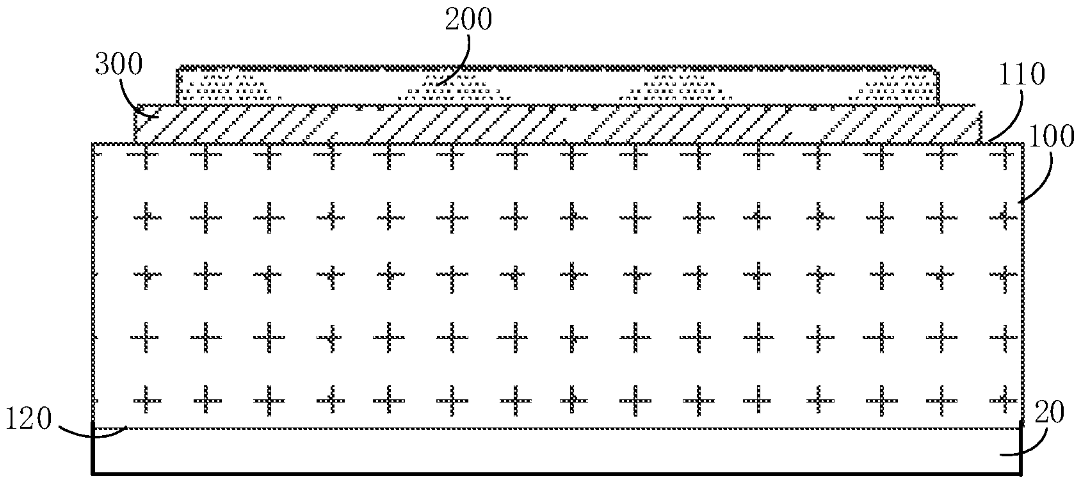
FIG. 6 is a cross-sectional view of FIG. 5.
Figure 7:
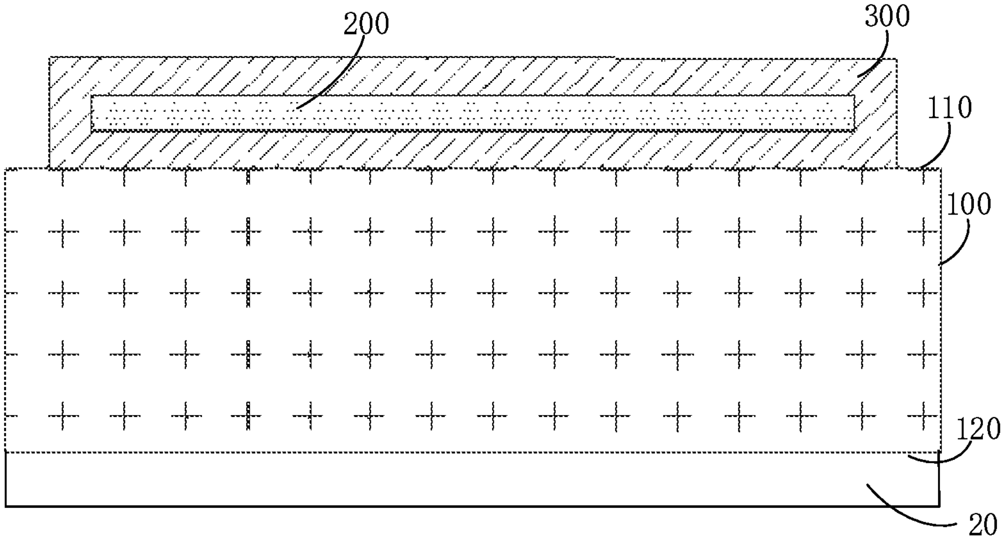
FIG. 7 is a cross-sectional view of the second example atomizing assembly provided by the second embodiment.
Figure 8:
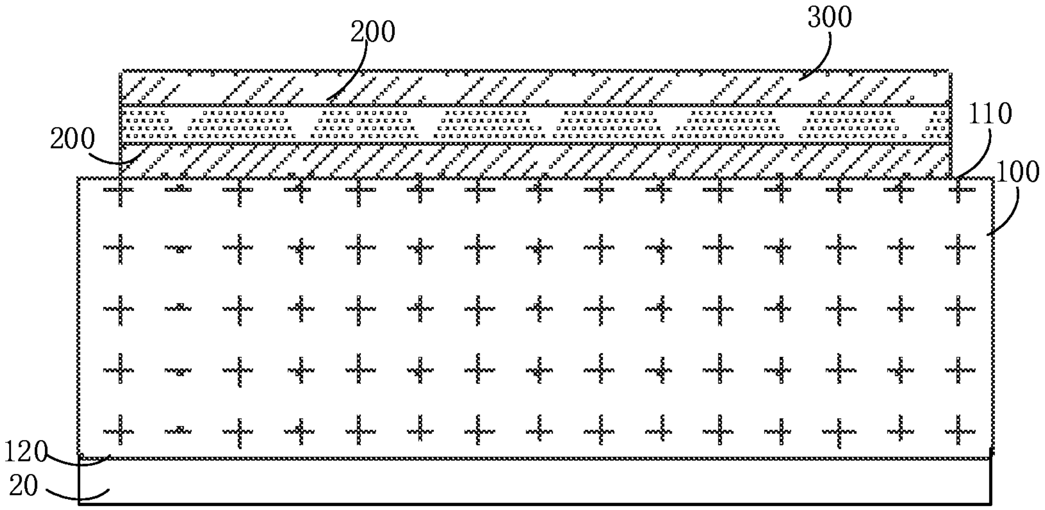
FIG. 8 is a cross-sectional view of a third example atomizing assembly provided by the second embodiment.

Referring to FIGS. 6 to 8 at the same time, the distance from the heating element 200 to the atomizing surface 110 is constant everywhere. Generally speaking, a plane where the heating element 200 is located is exactly parallel to the atomizing surface 110, which is convenient for processing and mounting the heating element 200 and the heat conductor 300, which also enables the heat on the heating element 200 to be transferred to the atomizing surface 110 at the same speed. The thickness of the heat conductor 300 is in a range from 20 μm to 150 μm. For example, the thickness of the heat conductor 300 can be 20 μm, 40 μm, 50 μm, or 150 μm. When the heating element 200 is attached to a heat conductor 300 or the heating element 200 is sandwiched between the two heat conductors 300, the thickness of the heat conductor 300 can be equal to the thickness of the heating element 200. When the heating element 200 is completely wrapped by the heat conductors 300, the thickness of the heat conductor 300 may be greater than the thickness of the heating element 200.

The present disclosure also provides an electronic atomizing device, which includes the aforementioned atomizing assembly 10. A liquid reservoir 20 is provided in the electronic atomizing device, and the liquid reservoir 20 is configured to store a liquid represented by an aerosol generating substrate. The liquid absorption surface 120 of the base body 100 can directly contact the liquid in the liquid reservoir 20. Under capillary effect, the liquid absorption surface 120 of the base body 100 transfers the liquid absorbed from the liquid reservoir 20 to the atomizing surface 110 through the interior of the base body 100, and then the heating element and the heat conductive element work together to make the smoke with the same concentration and particle size is formed in all parts of the atomizing surface 110.

The present disclosure has at least the following technical effects:

At the moment when the heating element 200 starts to work, the temperature of the heating region 111 is higher than the temperature of the blank region 112. The heat conductor 300 is connected to the heating element 200, and at least part of the heat conductor 300 is arranged in the blank region 112, the heat conductor 300 can transfer more heat from the heating region 111 to the blank region 112 to make up for the lack of heat in the blank region 112, the temperature of the blank region 112 is increased to be equal to the temperature of the heating region 111, ensuring all parts of the entire atomizing surface 110 have the same temperature to achieve thermal balance, that is, the heat distribution on the atomizing surface 110 is uniform, such that the concentration of the smoke formed by the atomization of the liquid on all parts of the atomizing surface 110 is equal, and at the same time, it also makes the particles of the smoke formed after the liquid is atomized on all parts of the atomizing surface 110 equal in size, which ultimately guarantees the user's inhale taste.

The technical features of the embodiments described above may be arbitrarily combined. For the sake of brevity of description, not all possible combinations of the technical features in the aforementioned embodiments are described. However, as long as there is no contradiction between the combinations of these technical features, all should be considered as the scope of this specification.

The aforementioned examples only express several implementation of the present disclosure, and the descriptions thereof are more specific and detailed, but they cannot be understood as a limitation on the scope of the present disclosure. It should be noted that, for those who skilled in the art, a plurality of modifications and improvements can be made without departing from the concept of the present disclosure, which all belong to the protection scope of the present disclosure. Therefore, the protection scope of the present disclosure shall be subject to the appended claims.

What is claimed is:

1. An atomizing assembly, comprising:

a base body comprising an atomizing surface configured to atomize liquid into smoke;

a heating element configured to be connected to a power source to heat the atomizing surface, the heating element being directly or indirectly disposed on the atomizing surface, and an area of a projection of the heating element on the atomizing surface being less than an area of the atomizing surface, such that the atomizing surface is divided into a heating region occupied by the projection of the heating element and a blank region surrounding the heating region; and a heat conductor at least partially disposed in the blank region of the atomizing surface and connected to the heating element, wherein the heat conductor is a porous ceramic film, porous carbon or a porous metal film, wherein a thermal conductivity of the heat conductor is higher than a thermal conductivity of the base body;

wherein both the heating element and the heat conductor are directly attached to the atomizing surface;

wherein the heat conductor comprises a plurality of heat conduction units discretely arranged, one end of the heat conduction unit is connected to the heating element, and the other end of the heat conduction unit is a free end and located in a blank region of the atomizing surface.

2. The atomizing assembly according to claim 1, wherein the heat conduction unit is linear, polygonal or curved in shape.

3. The atomizing assembly according to claim 1, wherein the heating element is an integrally formed open-loop structure, the heating element comprises a plurality of first heating units and a plurality of second heating units, the plurality of first heating units extend in a first direction and are spaced apart from each other, the plurality of second heating units extend in a second direction and are spaced apart from each other, the second direction forms a setting angle with the first direction, and both ends of the first heating unit are connected to ends of the two adjacent second heating units, respectively.

4. The atomizing assembly according to claim 3, wherein the second heating unit located at an end of the heating element has the largest width, and the first direction is perpendicular to the second direction.

5. The atomizing assembly according to claim 3, wherein the heat conductor comprises a plurality of heat conduction units discretely arranged, at least part of the heat conduction unit is connected to an intersection between the first heating unit and the second heating unit.

6. The atomizing assembly according to claim 1, wherein the heat conductor is attached to the heating region and the blank region of the atomizing surface, the heating element is attached to a surface of the heat conductor or is embedded inside the heat conductor; an area of a projection of the heat conductor on the atomizing surface is less than or equal to the area of the atomizing surface.

7. The atomizing assembly according to claim 6, wherein a distance from the heating element to the atomizing surface is constant everywhere.

8. The atomizing assembly according to claim 1, wherein the heating element is a metal heating film.

9. The atomizing assembly according to claim 1, wherein a porosity of the heat conductor is in a range from 30% to 70%.

10. The atomizing assembly according to claim 1, wherein a thickness of the heat conductor is in a range from 20 μm to 150 μm.

11. The atomizing assembly according to claim 1, wherein a thermal conductivity of the heat conductor is in a range from 30 w/m·k to 400 w/m·k.

12. An electronic atomizing device, comprising the atomizer according to claim 1.

13. The electronic atomizing device according to claim 12, wherein the electronic atomizing device is provided with a liquid reservoir configured to store the liquid, and the base body further comprises a liquid absorption surface, the liquid absorption surface transfers the liquid absorbed from the liquid reservoir to the atomizing surface through an interior of the base body.

* * * * *